(12) United States Patent
Sato et al.

(10) Patent No.: US 6,602,450 B1
(45) Date of Patent: Aug. 5, 2003

(54) METHOD FOR PRODUCING A THERMALLY INSULATING PLATE

(75) Inventors: Hisashi Sato, Kawasaki (JP); Hiromitsu Takeyasu, Kawasaki (JP); Chitoshi Suzuki, Kawasaki (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/673,665

(22) PCT Filed: Mar. 6, 2000

(86) PCT No.: PCT/JP00/01344

§ 371 (c)(1),
(2), (4) Date: Nov. 6, 2000

(87) PCT Pub. No.: WO00/51800

PCT Pub. Date: Sep. 8, 2000

(30) Foreign Application Priority Data

Mar. 4, 1999  (JP) ............................................. 11-057582

(51) Int. Cl.$^7$ ............................. B29C 44/06; C09K 3/00
(52) U.S. Cl. ................................ 264/46.5; 252/182.25; 264/51; 521/137; 521/914; 524/186
(58) Field of Search ................................. 568/700, 704; 528/44; 264/51, 46.5; 252/182.25; 524/186; 521/137, 914

(56) References Cited

U.S. PATENT DOCUMENTS

| 4,034,528 A | | 7/1977 | Sanders et al. | |
|---|---|---|---|---|
| 4,668,555 A | * | 5/1987 | Uekado et al. | 428/69 |
| 4,906,723 A | | 3/1990 | Hoy et al. | |
| 5,147,898 A | * | 9/1992 | Saito | 521/131 |
| 5,397,810 A | * | 3/1995 | Ozaki et al. | 521/137 |
| 5,496,894 A | * | 3/1996 | Critchfield et al. | 525/53 |
| 6,043,291 A | * | 3/2000 | Takeyasu et al. | 521/131 |

FOREIGN PATENT DOCUMENTS

| EP | 0 786 480 | 7/1997 |
|---|---|---|
| JP | 55-105541 | 8/1980 |
| JP | 62-263041 | 11/1987 |
| JP | 05-186678 | 7/1993 |
| WO | WO 98/44016 | 10/1998 |

* cited by examiner

Primary Examiner—Allan R. Kuhns
(74) Attorney, Agent, or Firm—Oblon, Spivak, McClelland, Maier & Neustadt, P.C.

(57) ABSTRACT

A method of producing a heat insulating board comprising two opposed facings and a core made of a rigid synthetic resin foam, which comprises spraying or injecting a foam mix for the rigid synthetic resin foam into the space between the opposed face materials and expanding and curing the foam mix, wherein the foam mix comprises a particular polyol, a polyisocyanate, a foam stabilizer, a catalyst and a blowing agent, wherein the polyol contains a polyether polyol having a hydroxyl value of at most 84 mgKOH/g and an oxyethylene group content of at least 40 wt %; a polyether polyol which is obtained by adding a cyclic ether to an amine compound and has a hydroxyl value of from 250 to 900 mgKOH/g; and fine polymer particles stably dispersed in the polyol.

10 Claims, No Drawings

METHOD FOR PRODUCING A THERMALLY INSULATING PLATE

TECHNICAL FIELD OF THE INVENTION

The present invention relates to a method of producing a heat insulating board comprising facings and a core made of a rigid synthetic resin foam.

BACKGROUND ART

Synthetic resin foams are commonly produced by the reaction of polyols and polyisocyanate compounds in the presence of catalysts and blowing agents.

Synthetic resin foams thus obtainable include polyurethane foams, urethane-modified polyisocyanurate foams, polyurea foams and the like.

Among various compounds known as blowing agents for production of these synthetic resin foams, trichlorofluoromethane (CFC-11) has been dominantly used, usually in combination with water, and in foaming by frothing, further coupled with the low-boiling dichlorodifluoromethane (CFC-12) (which is gaseous at ordinary temperature and pressure).

The conventionally used chlorofluorocarbons such as CFC-11 and CFC-12 are so stable in the atmosphere that it is supposed that they can reach the ozone layer above the atmospheric shell without being decomposed and decompose there by the action of ultraviolet light or the like, yielding a decomposition product which destroys the ozone layer.

There is a fear that leakage of part of the above-mentioned chlorofluorocarbons used as blowing agents into the atmosphere accompanying their use can be a cause of the ozone depletion.

Therefore, hydrochlorofluorocarbons such as 1,1-dichloro-2,2,2-trifluoroethane (HCFC-123), 1,1-dichloro-1-fluoroethane (HCHC-141b) and chlorodifluoromethane (HCHC-22) are proposed as blowing agents and are used increasingly because they are considered less risky by virtue of the presence of hydrogen atoms in the molecule that allows them to decompose before they reach the ozone layer above the atmospheric shell. Other compounds than hydrochlorofluorocarbons that have boiling points suitable for blowing agents and do not cause ozone depletion include hydrocarbons such as pentane, hexane, heptane, octane and their isomers. Further, water is also used as a blowing agent alone or in combination with the above-mentioned other blowing agents in view of its property of reacting with a polyisocyanate generating carbon dioxide gas which does not cause ozone depletion.

These compounds are used as environmentally friendly blowing agents. However, when used as blowing agents, they deteriorates the physical properties of synthetic resin foams, especially the dimension stability, causing foam shrinkage, as compared with conventional CFC-11. It is possible to keep up the quality of synthetic resin foams by increasing the density, but increase in the cost is inevitable.

Meanwhile, heat insulating boards comprising two opposed facings and a rigid synthetic resin foam core are produced by expanding and curing a foam mix for the rigid synthetic resin foam sprayed or injected into the space between the two opposed facings. The heat insulating boards thus obtained are roughly classified as boards and siding materials. Boards are obtained by using Kraft paper or veneer board as the facings and used as heat insulators for heat insulation barriers of refrigerators. Siding materials use metal plates or the like as the facings and are directly used as external building walls.

At any rate, because both boards and siding materials expose the synthetic resin foam on the edge faces, shrinkage of the exposed synthetic resin foam on the edge faces, though slight, is quite noticeable and problematic. Further, because of the competition between rigid synthetic resin foam boards and polystyrene boards and between rigid synthetic resin foam siding materials and ceramic siding materials, the demand for less shrinkage is very high to lower density and cost.

In addition, use of rigid synthetic foams in the housing field for air sealing and heat insulation has been increasing in recent years. Such applications can include rigid urethane-modified polyisocyanurate foams which are greater flame resistance than rigid polyurethane foams. Rigid urethane-modified polyisocyanurate foams are mostly obtained by using aromatic polyester diols which lower the crosslink density as the polyol component in view of physical properties such as flame resistance and therefore are more likely to suffer foam shrinkage.

It is known that foam shrinkage in production of rigid polyurethane foams is prevented by combined use of a polyol having a high hydroxyl value with a polymer-dispersed polyol (JP-A-57-25313).

A polymer-dispersed polyol is a composition which comprises a polyol such as polyether polyol or polyester polyol and fine particles of polymer of a monomer having a polymerizable unsaturated group dispersed in the polyol and has been used as a raw material for production of flexible and semi-rigid polyurethane foams to improve the physical properties of these polyurethanes. The above-mentioned combined use of a polymer-dispersed polyol with a polyol having a high hydroxyl value as a technique for production of rigid polyurethane foams with good dimension stability is supposed to be ascribed to some action of the fine polymer particles.

A known method for producing polymer-dispersed polyols comprises polymerizing a monomer having a polymerizable unsaturated group in a saturated polyol having no polymerizable unsaturated group, optionally in the presence of an unsaturated polyol having a polymerizable unsaturated group and then removing the unreacted reminder. As the polyol, various polyether polyols and polyester polyols are known.

Conventional polymer-dispersed polyols as described above are polymer-dispersed polyols having low hydroxyl values (not more than 50 mgKOH/g) for use as a component of a flexible or semi-rigid polyurethane foam. Therefore, conventional polymer-dispersed polyols having low hydroxyl values are hardly compatible with polyols having high hydroxyl values for rigid polyurethane foams, and because their combined use would end up with separation of the polyol having a low hydroxyl value or the polymer particles or too viscous a polyol mixture, conventional polymer-dispersed polyols having low hydroxyl values are unsuitable as a component of a rigid polyurethane foam.

In preparation of a polymer-dispersed polyol by polymerizing a monomer having a polymerizable unsaturated group in a polyol, as the hydroxyl value of the polyol increases (as the molecular weight of the polyol decreases), particles under growth generally becomes more likely to aggregate into lumps during the polymerization due to decrease in the stabilizing effect of the polyol on particles.

JP-A-2-240125 and JP-B-7-80986 mention polymer-dispersed polyols having high hydroxyl values, but the methods disclosed therein can not attain satisfactory improvement in dimension stability and satisfactorily stable dispersion of fine polymer particles.

Conventional polymer polyols do not have satisfactory dispersing power, and the fine polymer particles in a polyol premix composition tend to separate out, for example, during a storage stability test at 40° C.

The present invention solves the above-mentioned problems and provides a method of producing good heat insulating boards, especially boards or siding materials, characterized by use of a polymer-dispersed polyol having a high hydroxyl value in the form of a stable low-viscosity dispersion highly compatible with polyols for rigid synthetic resin foams which affords rigid synthetic resin foams with good dimension stability.

DISCLOSURE OF THE INVENTION

The present invention has been accomplished to solve the above-mentioned problems and provides:

a method of producing a heat insulating board comprising two opposed facings and a core made of a rigid synthetic resin foam, which comprises spraying or injecting a foam mix for the rigid synthetic resin foam into the space between the opposed facings and expanding and curing the foam mix, wherein the foam mix comprises the following polyol (V), a polyisocyanate, a foam stabilizer, a catalyst and a blowing agent:

polyol (V): a polyol containing the following polyether polyol (X), the following amine-type polyol (Y) and at least 0.01 wt %, based on the total weight of the polyol (V), of fine polymer particles stably dispersed in the polyol (V);

polyether polyol (X): a polyether polyol having a hydroxyl value of at most 84 mgKOH/g and an oxyethylene group content of at least 40 wt %; and amine-type polyol (Y): a polyether polyol which is obtained by adding a cyclic ether to an amine compound and has a hydroxyl value of from 250 to 900 mgKOH/g; and a polyol composition for production of a heat insulating board comprising two facings and a core made of a rigid synthetic resin foam by spraying or injecting a foam mix for the rigid synthetic resin obtained by mixing the polyol composition and a polyisocyanate compound into the space between the two opposed facings and expanding and curing the foam mix, which comprises the polyol (V), a foam stabilizer, a catalyst and blowing agent as essential components.

BEST MODE FOR CARRYING OUT THE INVENTION

[Polyol]

Polyols used as the constituents of the polyol (V) and the polymer-dispersed polyol (A) in the present invention will be described.

Such polyols include polyhydric alcohols, polyether polyols, polyester polyols and hydroxy-terminated hydrocarbon polymers.

The polyhydric alcohols include ethylene glycol, propylene glycol, diethylene glycol, dipropylene glycol, glycerin, trimethylolpropane, pentaerythritol, sorbitol, sucrose, diethanolamine and triethanolamine.

As polyether polyols, for example, polyether polyols obtained by adding a cyclic ether such as an alkylene oxide to an initiator such as a polyhydroxy compound like a polyhydric alcohol or a polyhydric phenol or an amine.

As the initiator, the following compounds and their cyclic ether adducts and mixtures of at least two of them are specifically mentioned.

Water, polyhydric alcohols such as ethylene glycol, diethylene glycol, propylene glycol, dipropylene glycol, neopentyl glycol, 3-methyl-1,5-pentanediol, 1,4-butanediol, 1,6-hexanediol, glycerin, trimethylolpropane, 1,2,6-hexanetriol, pentaerythritol, diglycerin, tetramethylolcyclohexane, a methyl glucoside, sorbitol, mannitol, dulcitol and sucrose, polyhydric phenols such as bisphenol A and prepolycondensates of phenol-formaldehyde, products of Mannich reactions of phenols-alkanolamines-aldehydes, and amines such as piperazine, aniline, monoethanolamine, diethanolamine, triethanolamine, isopropanolamine, aminoethylethanolamine, ammonia, N-aminomethylpiperazine, N-(2-aminoethyl)piperazine, ethylenediamine, propylenediamine, hexamethylenediamine, tolylenediamine, xylylenediamine, diphenylmethanediamine, diethylenetriamine and triethylenetetramine.

The cyclic ether used in the present invention are 3 to 6-membered cyclic ether compounds having one oxygen atom in the ring, and specifically, the following compounds are mentioned.

Compounds having a 3-membered cyclic ether group such as ethylene oxide, propylene oxide, isobutylene oxide, 1,2-butylene oxide, 2,3-butylene oxide, trimethylethylene oxide, tetramethylethylene oxide, butadiene monoxide, styrene oxide, α-methylstyrene oxide, epichlorohydrin, epifluorohydrin, epibromohydrin, glycidol, butyl glycidyl ether, hexyl glycidyl ether, phenyl glycidyl ether, 2-chloroethyl glycidyl ether, o-chlorophenyl glycidyl ether, cyclohexene oxide, dihydronaphthalene oxide and 3,4-epoxy-1-vinylcyclohexene; and compounds having a 4 to 6-membered cyclic ether group such as oxetane, tetrahydrofuran and tetrahydropyran.

Preferred are compounds having a 3-membered cyclic ether group (monoepoxides), and particularly preferred are $C_{2-4}$ alkylene oxides such as ethylene oxide, propylene oxide, isobutylene oxide, 1,2-butylene oxide and 2,3-butylene oxide.

These cyclic ethers may be used in combination, and in that case, may be added to the reaction system as a mixture or one by one. As the cyclic ether, a $C_{2-4}$ alkylene oxide, especially propylene oxide or a combination of propylene oxide and ethylene oxide, is particularly preferable.

As polyester polyols, for example, polyester polyols obtained by polycondensation of polyhydric alcohols and polycarboxylic acids may be mentioned. In addition, polyester polyols obtained by polycondensation of hydroxylcarboxylic acids, polymerization of cyclic esters (lactones), polyaddition of cyclic ethers to polycarboxylic anhydrides and ester exchange reactions of waste polyethylene terephthalate and the like may be mentioned. As the polyhydric alcohol, diols such as ethylene glycol, propylene glycol, diethylene glycol and dipropylene glycol are preferable. As the polycarboxylic acid, dicarboxylic acids such as adipic acid, sebacic acid, phthalic acid, terephthalic acid and isophthalic acid are preferable. As the cyclic ester, caprolactone and the like may be mentioned.

In the present invention, a small amount of another active-hydrogen compound may be used in combination with a polyol. For the combined use, active-hydrogen compounds such as polyamines and compounds having two or more phenolic hydroxyl groups (like a phenolic resin precondensate) may be mentioned.

As the polyamines, ethylenediamine, toluenediamine, diphenylmethanediamine and the like may be mentioned. Monoethanolamine may also be used.

The compounds having two or more phenolic hydroxyl groups include resol-type precondensates obtained by binding a phenol to an excess of formaldehyde by condensation in the presence of an alkali catalyst, benzylic-type precondensates obtained by carrying out the synthesis of a resol-type precondensate in a nonaqueous system, novolak-type precondensates obtained by reacting an excess of a phenol with formaldehyde in the presence of an acid catalyst. Precondensates having molecular weights of about from 200 to 10000 are preferred.

[Polyol (V)]

The polyol (V) in the present invention is a polyol containing the following polyether polyol (X), the following amine-type polyol (Y) and at least 0.01 wt %, based on the total weight of the polyol (V), of fine polymer particles stably dispersed in the polyol (V).

The amount of the fine polymer particles has to be at least 0.01 wt %, based on the total weight of the polyol (V). If the amount of the fine polymer particles is smaller than that, a rigid synthetic resin foam with good dimension stability is hardly obtainable. The amount is preferably at least 0.05 wt %. The amount is also preferred to be at most 50 wt %, particularly at most 30 wt %, more preferably at most 5 wt %, and most preferably less than 2 wt %.

The polyol (V) preferably has an average hydroxyl value of from 100 to 800 mgKOH/g, and more preferably has an average hydroxyl value of from 100 to 750 mgKOH/g.

When a rigid polyurethane foam is produced as the rigid synthetic resin foam, the polyol (V) is preferred to have an average hydroxyl value of from 200 to 800 mgKOH/g, in particular from 250 to 750 mgKOH/g. When a rigid urethane-modified polyisocyanurate foam is produced as the rigid synthetic resin foam, the average hydroxyl value is preferred to be from 100 to 550 mgKOH/g, in particular from 100 to 450 mgKOH/g.

The polyol (V) is preferably the following polymer-dispersed polyol (A) or a mixture of the polymer-dispersed polyol (A) with another polyol. The rigid synthetic resin foam may be produced from the polymer-dispersed polyol (A) alone. In other words, the polymer-dispersed polyol (A) may constitute 100 wt % of the polyol (V) but is preferably used in combination with a polyol usually used as a component of rigid synthetic resin foams.

Polymer-dispersed polyol (A): a polymer-dispersed polyol containing fine polymer particles obtained by polymerizing a monomer having a polymerizable unsaturated group stably dispersed in a polyol (W) having an average hydroxyl value of from 200 to 800 mgKOH/g, wherein the polyol (W) is a polyol mixture consisting of from 5 to 97 wt % of the polyether polyol (X) and from 3 to 95 wt % of the amine-type polyol (Y) or a polyol mixture consisting of from 5 to 97 wt % of the polyether polyol (X), from 3 to 95 wt % of the amine-type polyol (Y) and from more than 0 wt % to 92 wt % of the following polyol (Z):

polyol (Z): a polyol other than the polyether polyol (X) and the amine-type polyol (Y).

[Polyol (W)]

The polyol (W) used in the polymer-dispersed polyol (A) is a combination of the following specific polyols among the above-mentioned polyols.

Namely, it is a polyol mixture consisting of from 5 to 97 wt % of the polyether polyol (X) and from 3 to 95 wt % of the amine-type polyol (Y) or a polyol mixture consisting of from 5 to 97 wt % of the polyether polyol (X), from 3 to 95 wt % of the amine-type polyol (Y) and from more than 0 wt % to 92 wt % of the following polyol (Z).

The polyol (W) is preferably a polyol mixture consisting of from 5 to 97 wt % of the polyether polyol (X), from 3 to 95 wt % of the amine-type polyol (Y) and from more than 0 wt % to 92 wt % of the following polyol (Z).

The polyol (W) is particularly preferred to be a mixture consisting of from 10 to 60 wt % of the polyether polyol (X), from 5 to 35 wt % of the amine-type polyol (Y) and from more than 10 wt % to 85 wt % of the following polyol (Z).

A mixture consisting of from 25 to 50 wt % of the polyether polyol (X), from 8 to 25 wt % of the amine-type polyol (Y) and from more than 25 wt % to 67 wt % of the following polyol (Z) is most preferable.

The polyol (W) has an average hydroxyl value of from 200 to 800 mgKOH/g, preferably from 250 to 750 mgKOH/ g. If the average hydroxyl value of the polyol (W) is lower than that, the resulting polymer-dispersed polyol has little compatibility with polyols having high hydroxyl values for rigid synthetic resin foams and is difficult to use in combination with such polyols having high hydroxyl values for production of rigid synthetic resin foams due to separation of the polyols (fine polymer particles) or increase in viscosity. When the polyol (W) used for preparation of the polymer-dispersed polyol has a high average hydroxyl value, it hardly can give a polymer-dispersed polyol in which polymer particles are dispersed stably.

Now, (X), (Y) and (Z) will be described below.

[Polyether Polyol (X)]

The polyether polyol (X) in the present invention is preferably a polyether polyol described above under the item [Polyol] which has three or more functional groups or the polyether polyol described below.

Namely, a one obtained by adding ethylene oxide, or ethylene oxide and another cyclic ether to a polyhydric alcohol as the initiator is preferable. As the polyhydric alcohol, a trihydric alcohol such as glycerin, trimethylolpropane or 1,2,6-hexanetriol is preferable. As the other cyclic ether used in combination with ethylene oxide, propylene oxide, isobutylene oxide, 1,2-butylene oxide or 2,3-butylene oxide, in particular propylene oxide, is preferable.

The polyether polyol (X) is a polyether polyol having a hydroxyl value of at most 84 mgKOH/g. If the hydroxyl value is above 84 mgKOH/g, dispersion of the particles in the resulting polymer-dispersed polyol is less stable. It is preferred to be a polyether polyol having a hydroxyl value of at most 67 mgKOH/g, in particular at most 60 mgKOH/g. Although there is no lower limit on the hydroxyl value of the polyether polyol (X), it is preferred to be at least 5 mgKOH/g, in particular at least 20 mgKOH/g, more particularly at least 30 mgKOH/g.

The polyether polyol (X) has to have an oxyethylene group content of at least 40 wt %. If the oxyethylene group content is below that, stable dispersion of polymer particles in the resulting polymer-dispersed polyol can hardly be obtained. The oxyethylene group content is preferably at least 50 wt %, in particular at least 55 wt %. The upper limit of the oxyethylene group content is preferably about 100 wt %, in particular 90 wt %.

The amount of the polyether polyol (X) in the polyol (W) is from 5 to 97 wt %. If the amount of the polyether polyol (X) is below 5 wt %, a polymer-dispersed polyol having good dispersity is hardly obtained. It is preferred to be from 10 to 60 wt %, in particular from 25 to 50 wt %.

[Amine-type Polyol (Y)]

The amine-type polyol (Y) is a polyol having a hydroxyl value of from 250 to 900 mgKOH/g obtained by adding a cyclic ether to an amine compound as the initiator among the polyols described above under the item "Polyol". The hydroxyl value is preferred to be from 300 to 800 mgKOH/g, in particular from 350 to 800 mgKOH/g.

The amine compound is preferably an aromatic amine compound, an aliphatic amine compound or a saturated cyclic amine compound, in particular an aliphatic amine compound or a saturated cyclic amine compound. As the aliphatic amine compound, a $C_{1-20}$ aliphatic polyamine compound, especially a $C_{1-10}$ aliphatic polyamine, is preferred. Specifically, triethylenediamine, propylenediamine, hexamethylenediamine, diethylenetriamine, triethylenetetramine or the like may be mentioned. As the saturated cyclic amine compound, a $C_{1-20}$ saturated cyclic polyamine compound, especially $C_{1-10}$ saturated cyclic polyamine compound, is preferred. N-aminomethylpiperazine, N-(2-aminoethyl)piperazine or the like may be mentioned.

The amount of the amine-type polyol (Y) in the polyol (W) is from 3 to 95 wt %. If the amount of the amine-type polyol (Y) is lower than 3 wt %, the effect of improving the dimension stability of rigid synthetic resin foams obtained by using the polymer-dispersed polyol decreases. The upper limit is preferably 35 wt %. If the amount is higher than 35 wt %, the resulting polymer-dispersed polyol is unlikely to have low viscosity and good dispersity. The amount of the amine-type polyol (Y) is preferred to be from 5 to 35 wt %, in particular from 8 to 30 wt %, more particularly from 8 to 25 wt %.

[Polyol (Z)]

The polyol (W) may optionally contain, in addition to the polyether polyol (X) and the amine-type polyol (Y), another polyol (Z). The polyol (W) preferably contains the polyol (Z) in addition to the polyether polyol (X) and the amine-type polyol (Y).

The polyol (Z) is preferably a polyol having a hydroxyl value of from 200 to 1000 mgKOH/g, particularly preferably a polyol having a hydroxyl value of from 400 to 850 mgKOH/g.

As the polyol (Z), among the polyols mentioned under the item "Polyol", polyols other than the polyether polyol (X) and the amine-type polyol (Y) may be used.

When the polyol (Z) is used, the amount of the polyol (Z) in the polyol (W) is from more than 0 wt % to 92 wt %. The amount is preferably from 10 to 85 wt %, particularly from 25 to 67 wt %.

[Preparation of the Polymer-dispersed Polyol (A)]

For preparation of the polymer-dispersed polyol (A) by using the polyol (W), two methods are available, for example. The first method is by polymerically precipitating a monomer having a polymerizable unsaturated group into particles directly in the polyol (W), if necessary in the presence of a solvent, and the second method is by the polymeric precipitation of a monomer having a polymerizable unsaturated group into particles in a solvent, if necessary in the presence of a grafting agent for particle stabilization, and subsequent replacement of the solvent by the polyol (W) for obtaining stable dispersion. In the present invention, though either method is available, the first method is preferred.

The monomer having a polymerizable unsaturated group to be used in the present invention is usually a monomer having one polymerizable double bond, but is not limited thereto.

Specific examples of the monomer include ethylenic unsaturated nitriles such as acrylonitrile and methacrylonitrile; acrylic monomers such as acrylic acid, methacrylic acid, their alkyl esters, acrylamide and methacrylamide; cyano group-containing monoolefin monomers such as 2,4-dicyanobutene-1; styrene monomers such as styrene, a-methylstyrene and halogenated styrenes; vinyl carboxylate ester monomers such as vinyl acetate and vinyl propionate; isoprene, butadiene and other diolefin monomers; unsaturated fatty acid esters such as maleic diesters and itaconic diesters; vinyl halides such as vinyl chloride, vinyl bromide and vinyl fluoride; vinylidene halides such as vinylidene chloride, vinylidene bromide and vinylidene fluoride; alkyl vinyl ether monomers such as methyl vinyl ether, ethyl vinyl ether and isopropyl vinyl ether; other olefins and halogenated olefins; and the like. These monomers may be used in combination of at least two.

Preferred is the combination of from 5 to 90 wt % of an ethylenic unsaturated nitrile and from 10 to 95 wt % of another monomer. The combinations of an ethylenic unsaturated nitrile and a styrene monomer and the combination of an ethylenic unsaturated nitrile and a vinyl carboxylate ester monomer are preferable in order to obtain a polymer-dispersed polyol having a low viscosity and good dispersity. The combination of acrylonitrile and styrene and the combination of acrylonitrile and vinyl acetate are particularly preferable.

In the case of the combination of acrylonitrile and styrene, the acrylonitrile/styrene weight ratio is preferably 90-40/10-60, in particular 85-60/15-40.

In the case of the combination of acrylonitrile and vinyl acetate, the acrylonitrile/vinyl acetate weight ratio is preferably 50-10/50-90, in particular 40-15/60-85.

The amount of the above-mentioned monomer is not particularly limited but is preferably such that the polymer concentration of the resulting polymer-dispersed polyol (A) is about from 1 to 50 wt %, more preferably from 2 to 45 wt %, most preferably from 5 to 40 wt %.

For the polymerization of the monomer having a polymerizable unsaturated group, a polymerization initiator which initiates the polymerization by generating a free radical is usually used.

Specific examples include 2,2'-azobisisobutyronitrile (AIBN), 2,2'-azobis(2-methylbutyronitrile), 2,2'-azobis(2,4-dimethylvaleronitrile), dimethyl 2,2'-azobis(2-methylpropionate), benzoyl peroxide, diisopropyl peroxydicarbonate, acetyl peroxide, t-butyl peroxide, persulfate salts and the like. In particular, AIBN, 2,2'-azobis(2-methylbutyronitrile), 2,2'-azobis(2,4-dimethylvaleronitrile) and dimethyl 2,2'-azobis(2-methylpropionate) are preferred.

For preparation of a polymer-dispersed polyol, a semi-batch method in which polymerization is carried out under stirring in a reactor preliminarily loaded with part of a polyol by gradually feeding a mixture of the rest of the polyol, a monomer having a polymerizable unsaturated group, a polymerization initiator and the like, and a continuous method by continuous feeding of a mixture of the polyol, a monomer having a polymerizable unsaturated group, a polymerization initiator and the like into a reactor under stirring and simultaneous continuous discharge of the resulting polymer composition from the reactor, have been available conventionally. Either preparation method is applicable in the present invention.

In the semi-batch method and the continuous method, the polymerization is preferably performed at a temperature not lower than the decomposition temperature of the polymerization initiator, usually at from 50 to 150° C., preferably at 80 to 150° C., particularly preferably at from 100 to 130° C.

Further, when the monomer is the combination of an ethylenic unsaturated nitrile and a vinyl carboxylate ester monomer, polymerization of the monomer is unlikely to suffer from aggregation of the resulting particles, and the batch method mentioned below, which is unavailable for conventional polymer-dispersed polyols, is available.

Namely, a batch method in which the reaction is carried out by initiating elevation of the temperature after the reactor is loaded with all of a polyol (W), all of a monomer having a polymerizable unsaturated group and all of a radical polymerization initiator is available.

In the batch method, the polymerization reaction is carried out usually at a temperature not lower than the decomposition temperature of the polymerization initiator, preferably at from 50 to 120° C., particularly preferably at from 60 to 100° C.

During the polymerization of the monomer, the tendency that the resulting particles aggregate into lumps as they grow generally increases with the polymer concentration. To prevent this, preparation of the polymer-dispersed polyol may be carried out in the presence of a solvent.

Examples of the solvent includes alcohols such as methanol, ethanol, isopropyl alcohol, butanol, cyclohexanol and benzyl alcohol; aliphatic hydrocarbons such as pentane, hexane, cyclohexane and hexene; aromatic hydrocarbons such as benzene, toluene and xylene; ketones such as acetone, methyl ethyl ketone and acetophenone; esters such as ethyl acetate and butyl acetate; ethers such as isopropyl ether, tetrahydrofuran, benzyl ethyl ether, 1,1-diethoxyethane, 1,2-diethoxyethane, anisole and methyl t-butyl ether; halogenated hydrocarbons such as chlorobenzene, chloroform, 1,1-dichloroethane, 1,2-dichloroethane and 1,1,2-trichlorotrifluoroethane; nitro compounds such as nitrobenzene; nitrites such as acetonitrile and benzonitrile; amines such as trimethylamine, triethylamine, tributylamine and N,N-dimethylaniline; amides such as N,N-dimethylformamide and N-methylpyrrolidone; and sulfur compound such as dimethyl sulfoxide and sulfolane.

In the present invention, these solvents may be used singly or in combination. After the polymerization of the monomer having a polymerizable unsaturated group is over, the solvent is removed usually at reduced pressure under heating, optionally at atmospheric pressure under heating or at ordinary temperature and reduced pressure, together with the unreacted monomer.

The preparation method as described above affords a polymer-dispersed polyol in which polymer particles are dispersed with good stability. However, some types of monomer make it difficult to obtain a stable dispersion. For more stable dispersion of the particles, a polymerizable compound having a double bond in the molecule and a polyether or polyester chain may be used as a stabilizer or a grafting agent.

Such stabilizers and grafting agents include high-molecular weight polyols and monools obtained by reacting an active hydrogen compound having a double bond-containing group such as a vinyl group, an allyl group or an isopropenyl group as the initiator with an alkylene oxide; high-molecular weight polyols and monools obtained by reacting a polyether polyol with an unsaturated carboxylic acid or its anhydride such as maleic anhydride, itaconic anhydride, maleic acid, fumaric acid, acrylic acid or methacrylic acid and, if necessary, then adding an alkylene oxide such as propylene oxide or ethylene oxide; products of reaction of an alcohol containing an unsaturated group such as 2-hydroxyethyl acrylate or butenediol, another polyol and a polyisocyanate; and products of reaction between an epoxy compound containing an unsaturated group such as allyl glycidyl ether, a polyol and the like. These compounds are preferred, though not required, to have a hydroxyl group.

The hydroxyl value of the polymer-dispersed polyol (A) is preferably from 200 to 800 mgKOH/g, more preferably from 200 to 750 mgKOH/g, and particularly preferably from 250 to 750 mgKOH/g, and is usually lower than that of the polyol (W) used as the base.

The polymer-dispersed polyol (A) is preferred, but not required, not to undergo separation in at least 1 month, particularly in at least two months, more particularly in at least three months, on standing. The excellent dispersion stability of the polymer-dispersed polyol in the present invention is supposedly attributed to the fineness and size uniformity of the fine polymer particles obtained by polymerizing a monomer having a polymerizable unsaturated group.

[Other Polyols]

Polyols other than the polymer-dispersed polyol (A) which are used as the polyol (V) include polyhydric alcohols, polyether polyols, polyester polyols and hydroxy-terminated hydrocarbon-type polymers like those mentioned above under the item "Polyol". In addition, polyether polyols obtained by the Mannich reaction of a phenol, an alkanolamine and an aldehyde followed by addition of a cyclic ether or the like may be used. Further, the above-mentioned (W), (X), (Y) or (Z) may be used.

The polyol (V) preferably consists of the polymer-dispersed polyol (A) alone or a mixture of from 0.1 wt % to less than 100 wt % of the polymer-dispersed polyol (A) and from more than 0 wt % to 99.9 wt % of another polyol, and the latter is preferred. A mixture of 0.3 to less than 100 wt % and from 99.7 to more than 0 wt % of another polyol is particularly preferred.

Further, compounds having relatively low molecular weights called chain extenders or crosslinking agents may be used together with the polyol (V). For example, polyamines, monoamines, polyhydric phenols and the like may be used. Preferred are polyamines such as hexamethylenediamine and 4,4-diaminodiphenylmethane and polyhydric phenols such as bisphenol A. Such a compound is used in an amount of from 0 to 50 wt %, preferably from 0 to 10 wt %, relative to 100 wt % of the polyol (V).

For production of a rigid urethane-modified polyisocyanurate foam, use of a polyester polyol is particularly preferred. As the polyester polyol, a polyester polyol obtained by polycondensation of a polyhydric alcohol and polycarboxylic acid is preferably, though a previously mentioned polyester polyol may be used. As the polycarboxylic acid, an aromatic dicarboxylic acid such as phthalic acid, terephthalic acid or isophthalic acid is preferably used. The polyester polyol is preferred to have a hydroxyl value of from 100 to 450 mgKOH/g, in particular from 100 to 350 mgKOH/g. The proportion of the polyester polyol in the polyol (V) is preferably from 20 to 99.9 wt %, in particular from 50 to 99.9 wt %.

When the proportion of the polyester polyol is at a relatively low level of from 20 to 50 wt %, it is preferred to use a polyether polyol obtained by adding a cyclic ether to a polyhydric phenol such as bisphenol A or a phenol-formaldehyde prepolycondensate or a polyether polyol obtained by adding a cyclic ether to the product of the Mannich reaction of a phenol, an alkanolamine and an aldehyde in combination.

[Other Ingredients]

As the polyisocyanate compound, an aromatic, aliphatic or alicyclic polyisocyanate having at least two isocyanate groups on average, a mixture thereof or a modified polyisocyanate obtained by modification thereof may be mentioned. Specific examples are polyisocyanates such as tolylene diisocyanate, diphenylmethane diisocyanate, polymethylenepolyphenyl diisocyanate (common name: crude MDI), xylylene diisocyanate, isophorone diisocyanate and hexamethylene diisocyanate, their prepolymeric modifications, nurate modifications, urea modifications, carbodiimide modifications and the like.

As the foam stabilizer, those usually used for production of rigid synthetic resin foams such as silicone-type foam stabilizers and fluorine-containing compound-type foam stabilizers may be used. The foam stabilizer is used preferably in an amount of from 0.01 to 10 parts by weight, in particular from 0.1 to 5 parts by weight, in relation to 100 parts by weight of the polyol.

As the catalyst, those usually used for production of rigid synthetic resin foams such as amine-type catalysts represented by tertiary amines such as N,N,N',N'-tetramethylethylenediamine, N,N,N',N'-tetramethylhexane-1,6-diamine, N,N,N',N'-tetramethylpropane-1,3-diamine, N,N,N',N",N"-pentamethyldiethylenetriamine, N-methyl-N'-[(2-dimethylamino)-ethylpiperazine], N,N-dimethylcyclohexylamine, bis[(2-dimethylamino)ethyl] ether, {for example, a mixture of 70 wt % of bis[(2-dimethylamine)ethyl] ether and 30 wt % of dipropylene glycol}, N,N',N"-tris(3-dimethylaminopropyl)hexahydro-sym-triazine, N,N-dimethylbenzylamine, N-methylmorpholine, N-ethylmorpholine, triethylenediamine, {for example, a mixture of 33 wt % of triethylenediamine and 67 wt % of dipropylene glycol}, N,N-dimethylethanolamine, trimethylaminoethylethanolamine, N,N-dimethylaminoethoxyethanol, N,N-dimethylaminoethoxyethoxyethanol and N,N-dimethylaminohexanol, organic metal compounds such as organic lead compounds and organic tin compounds such as lead 2-ethylhexanoate, quaternary ammonium salt catalysts and the like may be used.

For use in production of a rigid urethane-modified polyisocyanurate foam, amine-type catalysts such as N,N',N"-tris(dimethylaminopropyl)hexahydro-sym-triazine and catalysts for isocyanuration such as potassium acetate, potassium 2-ethylhexanoate and quaternary ammonium salt catalysts are particularly preferred.

The catalyst is used preferably in such an amount that the gelation time of the foam mix in hand expansion at 20° C. is from 5 to 150 seconds, in particular from 10 to 100 seconds, which is equivalent to from 0.1 to 10 parts by weight in relation to 100 parts by weight of the polyol.

In the present invention, it is preferred to use water as the blowing agent. Water is preferably used in an amount of from 0.1 to 10 parts by weight in relation to 100 parts by weight of the polyol. In the present invention, the blowing agent may be water alone or the combination of water and a low-boiling halogenated hydrocarbon.

Low-boiling halogenated hydrocarbons which can be used in combination with water are not particularly restricted and include HCFC-123, HCFC-141b, chlorodifluoromethane (HCFC-22), 1,1,1,2-tetrafluoroethane (HFC-134a), 1-chloro-1,1-difluoroethane (HCFC-142b), 1,1-dichloro-2,2,3,3,3-pentafluoropropane (HCFC-225ca), 1,3-dichloro-1,1,2,2,3-pentafluoropropane (HCFC-225cb), pentafluoroethane (HFC-125), 1,1,2-trifluoroethane (HFC-143), 1,1,1-trifluoroethane (HFC-143a), 1,1-difluoroethane (HFC-152a), 1,1,1,3,3-pentafluoropropane (HFC-245fa), 1,1,2,2,3-pentafluoropropane (HFC-245ca), 1,1,1,2,3,3-hexafluoropropane (HFC-236ea), 1,1,1,4,4,4-hexafluoropropane (HFC-356mff) and 1,1,1,3,3-pentafluorobutane (HFC-365mfc).

Other halogenated hydrocarbons which do not contain fluorine such as methylene chloride, hydrocarbons having carbon numbers of at most 10 such as butane, cyclopentane, n-pentane, cyclohexane and n-hexane and inert gases such as air, nitrogen and carbon dioxide gas may be used as well in combination as the blowing agent.

A blowing agent other than water is used preferably in an amount of from 1 to 70 parts by weight in relation to 100 parts by weight of the polyol.

In addition, for example, a filler, a stabilizer, a colorant, a flame retardant and the like may be used arbitrarily.

[Polyol Composition]

The present invention provides a polyol composition for production of a heat insulating board comprising two facings and a core made of a rigid synthetic resin foam by spraying or injecting a foam mix for the rigid synthetic resin foam obtained by mixing the polyol composition and a polyisocyanate compound into the space between the two opposed facings and expanding and curing the foam mix, which comprises the polyol (V), a foam stabilizer, a catalyst and blowing agent as essential components. The polyol composition is a premix to be mixed with a polyisocyanate to give a reaction leading to formation of a rigid synthetic resin foam and is a so-called "polyol system".

The above-mentioned polyol (V) itself shows good dispersion stability. And a polyol composition obtained from it by adding additives necessary for production of a rigid synthetic resin foam also shows excellent dispersion stability. The polyol composition is preferred not to undergo separation in at least 1 month, particularly in at least two months, more particularly in at least three months, on standing.

[Production Method]

The present invention provides a method of producing a heat insulating board comprising two facings and a core made of a rigid synthetic resin foam, which comprises spraying or injecting a foam mix for the rigid synthetic resin foam into the space between the opposed facings and expanding and curing the foam mix.

As the rigid synthetic resin foam, a rigid polyurethane foam, a rigid modified polyisocyanurate foam, a rigid urethane-modified polyurea foam or the like may be mentioned.

As the facings, hard facings and soft facings may be used. Hard facings include metal plates made of steel, aluminum and stainless steel, plasterboard, cement excelsior board, Kraft pasteboard and the like. Soft facings include Kraft paper, asphalt felt, aluminum foil, glass paper and the like.

The two facings to be used in the present invention may be the same or different, namely may be two hard materials or two soft materials, or a hard material and a soft material.

The heat insulating board in the present invention is produced continuously on a conveyer such as a horizontal double conveyer line or an inverse line. For example, the foam mix for the rigid synthetic resin foam in the present invention may be sprayed or injected into the space between two facings placed respectively on the opposed upper and lower conveyers of a horizontal double conveyer line or an inverse line.

The foam mix for the rigid synthetic resin foam is obtained by mixing the above-mentioned polyol composition of the present invention and a polyisocyanate compound. The foam mix for the rigid synthetic resin foam may be passed through a nip roller to secure uniform dispersity, may be forced to traverse a mixing head of a spray nozzle type or the like to secure uniform dispersity, or may be forced to traverse more than one mixing head to be sprayed evenly and uniformly.

The method of the present invention can provide heat insulating boards based on a rigid synthetic resin foam, especially boards and siding materials, having good dimension stability. The polyol composition of the present invention shows excellent dispersion stability and has an effect that it can be used without any trouble even after a long time of standing.

EXAMPLES

Now, the present invention will be described in further detail with reference to Examples and Comparative Examples, but it should be understood that the present invention is by no means restricted thereto. In the Tables, AN denotes acrylonitrile St denotes styrene, Vac denotes vinyl acetate, and MMA denotes methacrylic methyl. The units for the figures in the Tables are parts by weight unless otherwise noted. The following polyols were used.

Polyol a: a polyether polyol with a hydroxyl value of 470 mgKOH/g prepared by adding propylene oxide to the Mannich reaction product of nonylphenol, formaldehyde and diethanolamine, polyol b: a polyether polyol with a hydroxyl value of 760 mgKOH/g prepared by adding propylene oxide to ethylenediamine, polyol c: a polyether polyol with a hydroxyl value of 450 mgKOH/g prepared by adding propylene oxide to a mixture of sucrose and diethanolamine, polyol d: a polyether polyol with a hydroxyl value of 280 mgKOH/g prepared by adding ethylene oxide to bisphenol A, polyol e: a polyester polyol with a hydroxyl value of 250 mgKOH/g having phthalic acid residues.

polyol f: a polyether polyol with an oxyethylene group content of 10 wt % and a hydroxyl value of 300 mgKOH/g prepared by adding propylene oxide and ethylene oxide to the Mannich reaction product of nonylphenol, formaldehyde and diethanolamine, polyol g: a polyether polyol with a hydroxyl value of 300 mgKOH/g prepared by adding propylene oxide to ethylenediamine, polyol h: a polyether polyol with a hydroxyl value of 300 mgKOH/g prepared by adding propylene oxide to a mixture of sucrose and diethanolamine, polyol i: a polyether polyol with a hydroxyl value of 450 mgKOH/g prepared by adding propylene oxide to glycerin, polyol j: a polyether polyol with a hydroxyl value of 650 mgKOH/g prepared by adding propylene oxide to glycerin, polyol k: a polyether polyol with a hydroxyl value of 50 mgKOH/g and an oxyethylene group content of 25 wt % prepared by randomly adding propylene oxide and ethylene oxide to glycerin, polyol p: a polyether polyol with a hydroxyl value of 50 mgKOH/g and an oxyethylene group content of 55 wt % prepared by randomly adding propylene oxide and ethylene oxide to glycerin, polyol m: a polyether polyol with a hydroxyl value of 50 mgKOH/g and an oxyethylene group content of 75 wt % prepared by randomly adding propylene oxide and ethylene oxide to glycerin, polyol n: a polyether polyol with a hydroxyl value of 500 mgKOH/g prepared by adding propylene oxide to ethylenediamine, and polyol q: a polyether polyol with a hydroxyl value of 56 mgKOH/g and an oxyethylene group content of 10 wt % by adding propylene oxide and ethylene oxide to glycerin.

Examples 1 to 6

Preparation of the polymer-dispersed polyols will be exemplified.

Preparation of Polymer-dispersed Polyols A, B, D, E and F 70 wt % of polyol mixtures shown in Table 1 were loaded into a 5 L pressure reactor, and while they were stirred at a constant temperature of 120° C., the rest of the polyol mixtures and mixtures of monomers shown in Table 1 and AIBN were fed over 4 hours. After the feeding was over, stirring at the same temperature was done for about 0.5 hour until at lease 90% of the monomer was consumed in each Example. After the reaction was over, the unreacted monomers were removed by 2 hours of evacuation under heating at 120° C. at a reduced pressure of 0.1 mmHg, to obtain polymer-dispersed polyols.

The hydroxyl values (unit: mgKOH/g), the viscosities at 25° C. (unit: cP) and the dispersion stability of the respective polyols are shown in Table 1.

Polyol F, a polymer-dispersed polyol prepared without using the polyol (W) as defined in the present invention, underwent phase separation, giving no uniform dispersion, and measurement of its viscosity was impossible.

Preparation of Polymer-dispersed Polyol C

The polyol and monomer shown in Table 1 and AIBN were loaded into a 5 L pressure reactor. After the temperature was raised under stirring, reaction was carried out for 10 hours while the reaction solution was maintained at 80° C. until at lease 80% of the monomer was consumed. After the reaction was over, the unreacted monomer was removed by 2 hours of evacuation under heating at 110° C. at a reduced pressure of 0.1 mmHg, to obtain a polymer-dispersed polyol. The hydroxyl value (unit: mgKOH/g), the viscosity at 25° C. (unit: cP) and the dispersion stability are shown in Table 1.

Foaming Evaluation 1

Examples 7 to 55

Examples of Preparation of Rigid Polyurethane Foams 100 parts by weight in total of the polyol mixtures shown in Tables 2 to 5, the blowing agents in the amounts shown in Tables 2 to 5, N,N-dimethylcyclohexylamine (trade name: Kaolyzer No. 10, Kao Corporation) as a catalyst in such amounts in part by weight that gelation time of the foam mix in hand expansion (at a liquid temperature of 20° C.) was 50 seconds, 1.5 parts by weight of a silicone-type foam stabilizer (SH-193, Toray & Dow Corning Silicone Co., Ltd.) and 10 parts by weight of tris(2-chloropropyl) phosphate (TMCPP, Daihachi Chemical Industry Co., Ltd.) as a flame retarder were blended into polyol compositions.

The blowing agents used were water, blowing agent a: HCFC-141b, blowing agent b: HCFC-22, blowing agent c: HFC-134a, blowing agent d: HFC-245fa, blowing agent e: cyclopentane and blowing agent f: n-pentane.

The resulting polyol compositions were mixed with polymethylene polyphenyl isocyanate (MR-200, Nippon Polyurethane Co., Ltd.) as an isocyanate at a liquid temperature of 20° C. so that the isocyanate index would be 110, and the mixtures were poured into wood boxes with a 200 mm depth×a 200 mm width×a 200 mm height and expanded to give rigid polyurethane foams.

Examples 56 to 105

Examples of Preparation of Rigid Urethane-modified Polyisocyanurate Foams 100 parts by weight in total of the polyol mixtures shown in Tables 6 to 9, the blowing agents in the amounts shown in Tables 6 to 9, a mixture of N,N',N"-tris (dimethylaminopropyl)hexahydro-sym-triazine (trade name: Polycat 41, Air Products and Chemicals Inc.) and a potassium 2-ethylhexanoate solution (potassium 15%, trade name: Pcat 15G, Nihon Kagaku Sangyo Co., Ltd.) as a catalyst in such amounts in part by weight that gelation time of the raw foam in hand expansion (at a liquid temperature of 20° C.) was 50 seconds, 1.5 parts by weight of a silicone-type foam stabilizer (SH-193, Toray & Dow Corning Silicone Co., Ltd.) and 20 parts by weight of TMCPP were blended into polyol compositions.

The resulting polyol compositions were mixed with polymethylene polyphenyl isocyanate (MR-200, Nippon Polyurethane Co., Ltd.) as an isocyanate at a liquid temperature of 20° C. so that the isocyanate index would be 200, and the mixtures were poured into wood boxes with a 200 mm depth×a 200 mm width×a 200 mm height and expanded to give rigid urethane-modified polyisocyanurate foams.

Evaluation of Foams

The core densities (unit: kg/m$^3$), low-temperature shrinkage percentages (unit:%) and ordinary-temperature shrinkage percentages (unit:%) of the resulting foams and the storage stability of the polyol compositions are shown in Tables 2 to 9.

The shrinkage percentage denotes the dimensional change perpendicular to the direction of expansion measured after 24 hours of storage at −30° C., and the ordinary-temperature percentage denotes the dimensional change perpendicular to the direction of expansion measured after 1 month of storage at 25° C.

The evaluation of the storage stability of the polyol compositions were based on whether or not the polyol composition had separated after 2 months of standing at 40° C. Stable ones which did not cause separation were rated as ○, and those which caused separation were rated as X.

In Table 2, Examples 7 to 13 are Working Examples, and Examples 14 to 18 are Comparative Examples. In Table 3, Examples 19 to 24 are Working Examples, and Examples 25 to 29 are Comparative Examples. In Table 4, Examples 30 to 37 are Working Examples, and Examples 38 to 43 are Comparative Examples. In Table 5, Examples 44 to 50 are Working Examples, and Examples 51 to 55 are Comparative Examples. In Table 6, Examples 56 to 62 are Working Examples, and Examples 63 to 67 are Comparative Examples. In Table 7, Examples 68 to 74 are Working Examples, and Examples 75 to 79 are Comparative Examples. In Table 8, Examples 80 to 87 are Working Examples, and Examples 88 to 93 are Comparative Examples. In Table 9, Examples 94 to 100 are Working Examples, and Examples 101 to 105 are Comparative Examples.

As shown in Tables 2 to 9, all the rigid polyurethane foams and rigid urethane-modified nurate foams obtained from polymer-dispersed polyols A, B and C showed good dimension stability. The polyol compositions obtained from polymer-dispersed polyols A, B and C showed good storage stability, whereas the polyol composition obtained from polymer-dispersed polyols D and E showed insufficient storage stability.

Foaming Evaluation 2

Pairs of facings made of Kraft paper were carried in parallel on belt conveyers of an inverse line. The foam mixes having the same compositions as those in Examples 7 to 13, Examples 19 to 24, Examples 30 to 37, Examples 44 to 50, Examples 56 to 62, Examples 68 to 74, Examples 80 to 87 and Examples 94 to 100 were sprayed uniformly into the spaces between the respective pairs of upper and lower facings through a spray nozzle-type mixing head. After subsequent post-curing in a heat tunnel (a cure zone), boards were obtained. The boards thus obtained had good dimension stability with no shrinkage on the edge faces.

TABLE 1

| Example | 1 | 2 | 3 | 4 | 5 | 6 |
|---|---|---|---|---|---|---|
| Name | A | B | C | D | E | F |
| Polyol i | | 900 | | | | |
| Polyol j | 1125 | | 925 | 1350 | | 1350 |
| Polyol k | | | | | | 900 |
| Polyol p | 790 | | 925 | | | |
| Polyol m | | 900 | | 900 | | |
| Polyol b | | 450 | 400 | | | |
| Polyol n | 335 | | | | | |
| Polyol q | | | | | 2250 | |
| AN | 560 | 600 | 150 | 560 | 560 | 560 |
| St | 190 | 150 | | 190 | 190 | 190 |
| VAc | | | 600 | | | |
| AIBN | 15 | 15 | 25 | 15 | 15 | 15 |
| Hydroxyl value | 325 | 280 | 330 | 320 | 45 | — |
| Viscosity | 4000 | 4300 | 1500 | 3200 | 4100 | — |
| Dispersion stability | Good | Good | Good | Good | Good | Phase separation |

TABLE 2

| | 7 | 8 | 9 | 10 | 11 | 12 | 13 | 14 | 15 | 16 | 17 | 18 |
|---|---|---|---|---|---|---|---|---|---|---|---|---|
| Polyol a | 50 | 50 | 50 | 50 | 50 | 50 | 50 | 50 | 50 | 50 | 50 | 50 |
| Polyol b | 30 | 30 | 30 | 30 | 30 | 30 | 30 | 30 | 30 | 30 | 30 | 30 |
| Polyol c | | | | | | | 20 | | | | | |
| Polyol e | 20 | 20 | 20 | 20 | 20 | 20 | | 20 | 20 | 20 | 20 | 20 |
| Polyol A | 3.0 | | | | | | | | | | | |
| Polyol B | | 3.0 | 2.0 | | | | | | | | | |
| Polyol C | | | | 2.0 | 2.0 | 2.0 | 2.0 | | | | | |
| Polyol D | | | | | | | | 3.0 | | 3.0 | 3.0 | |
| Polyol E | | | | | | | | | 3.0 | | | |
| Blowing agent | | | | | | | | | | | | |
| Water | 3.0 | 3.0 | 3.0 | 3.0 | 3.0 | 3.0 | 3.0 | 3.0 | 3.0 | 3.0 | 3.0 | 3.0 |
| a | 35 | 35 | 35 | 35 | 35 | 35 | 35 | 35 | 35 | 35 | 35 | 35 |
| b | | | | 4.0 | | | | | | 4.0 | | |
| c | | | | | 4.0 | | | | | | 4.0 | |
| Density | 22 | 22 | 22 | 22 | 20 | 20 | 22 | 22 | 22 | 20 | 20 | 22 |
| Low-temperature shrinkage percentage | 0.5 | 0.4 | 0.2 | 0.0 | 0.0 | 0.1 | 0.3 | 7.7 | 10 | 5.0 | 7.0 | 12 |
| Storage stability | ○ | ○ | ○ | ○ | ○ | ○ | ○ | x | x | x | x | ○ |

TABLE 3

| | 19 | 20 | 21 | 22 | 22' | 23 | 24 | 25 | 26 | 27 | 28 | 29 |
|---|---|---|---|---|---|---|---|---|---|---|---|---|
| Polyol a | 50 | 50 | 50 | 50 | 50 | 50 | 50 | 50 | 50 | 50 | 50 | 50 |
| Polyol b | 30 | 30 | 30 | 30 | 30 | 30 | 30 | 30 | 30 | 30 | 30 | 30 |
| Polyol c | | | | | | | 20 | | | | | |
| Polyol e | 20 | 20 | 20 | 20 | 20 | 20 | 20 | | 20 | 20 | 20 | 20 |
| Polyol A | 3.0 | | | | | | | | | | | |
| Polyol B | | 3.0 | 2.0 | | | | | | | | | |
| Polyol C | | | | 2.0 | 2.0 | 2.0 | 2.0 | | | | | |
| Polyol D | | | | | | | | 3.0 | | 3.0 | 3.0 | |
| Polyol E | | | | | | | | | 3.0 | | | |
| Blowing agent | | | | | | | | | | | | |
| Water | 3.0 | 3.0 | 3.0 | 3.0 | 3.0 | 3.0 | 3.0 | 3.0 | 3.0 | 3.0 | 3.0 | 3.0 |
| d | 45 | 45 | 45 | 45 | 45 | 45 | 45 | 45 | 45 | 45 | 45 | 45 |
| b | | | | 4.0 | | | | | | 4.0 | | |
| c | | | | | 4.0 | | | | | | 4.0 | |
| Density | 20 | 20 | 20 | 20 | 18 | 18 | 20 | 20 | 20 | 18 | 18 | 20 |
| Low-temperature shrinkage percentage | 0.4 | 0.4 | 0.2 | 0.0 | 0.0 | 0.1 | 0.3 | 7.9 | 9.9 | 5.3 | 7.3 | 10 |
| Storage stability | ○ | ○ | ○ | ○ | ○ | ○ | ○ | x | x | x | x | ○ |

TABLE 4

|  | 30 | 31 | 32 | 33 | 34 | 35 | 36 | 37 | 38 | 39 | 40 | 41 | 42 | 43 |
|---|---|---|---|---|---|---|---|---|---|---|---|---|---|---|
| Polyol a | 50 | 50 | 50 | 50 | 50 | 50 | 50 | 50 | 50 | 50 | 50 | 50 | 50 | 50 |
| Polyol b | 30 | 30 | 30 | 30 | 30 | 30 | 30 | 30 | 30 | 30 | 30 | 30 | 30 | 30 |
| Polyol c |  |  |  | 20 |  |  |  | 20 |  |  |  |  |  |  |
| Polyol e | 20 | 20 | 20 |  | 20 | 20 | 20 |  | 20 | 20 | 20 | 20 | 20 | 20 |
| Polyol A | 3.0 |  |  |  | 3.0 |  |  |  |  |  |  |  |  |  |
| Polyol B |  | 3.0 |  |  |  | 3.0 |  |  |  |  |  |  |  |  |
| Polyol C |  |  | 3.0 | 3.0 |  |  | 3.0 | 3.0 |  |  |  |  |  |  |
| Polyol D |  |  |  |  |  |  |  |  | 3.0 |  | 3.0 |  |  |  |
| Polyol E |  |  |  |  |  |  |  |  |  | 3.0 |  | 3.0 |  |  |
| Blowing agent |  |  |  |  |  |  |  |  |  |  |  |  |  |  |
| Water | 3.5 | 3.5 | 3.5 | 3.5 | 3.5 | 3.5 | 3.5 | 3.5 | 3.5 | 3.5 | 3.5 | 3.5 | 3.5 | 3.5 |
| e | 16 | 16 | 16 | 16 |  |  |  |  | 16 | 16 |  |  | 16 |  |
| f |  |  |  |  | 16 | 16 | 16 | 16 |  |  | 16 | 16 |  | 16 |
| Density | 21 | 21 | 21 | 21 | 21 | 21 | 21 | 21 | 21 | 21 | 21 | 21 | 21 | 21 |
| Low-temperature shrinkage percentage | 0.4 | 0.4 | 0.2 | 0.0 | 0.0 | 0.1 | 0.2 | 0.3 | 7.7 | 9.8 | 5.5 | 7.8 | 12 | 11 |
| Storage stability | ○ | ○ | ○ | ○ | ○ | ○ | ○ | ○ | x | x | x | x | ○ | ○ |

TABLE 5

|  | 44 | 45 | 46 | 47 | 48 | 49 | 50 | 51 | 52 | 53 | 54 | 55 |
|---|---|---|---|---|---|---|---|---|---|---|---|---|
| Polyol f | 50 | 50 | 50 | 50 | 50 | 50 |  | 50 | 50 | 50 | 50 | 50 |
| Polyol g | 30 | 30 | 30 | 30 | 30 | 30 | 40 | 30 | 30 | 30 | 30 | 30 |
| Polyol h | 20 | 20 | 20 | 20 | 20 | 20 | 60 | 20 | 20 | 20 | 20 | 20 |
| Polyol A | 10 |  |  |  |  |  |  |  |  |  |  |  |
| Polyol B |  | 10 | 5.0 |  |  |  |  |  |  |  |  |  |
| Polyol C |  |  | 5.0 | 5.0 | 5.0 | 5.0 |  |  |  |  |  |  |
| Polyol D |  |  |  |  |  |  |  | 10 |  | 10 | 10 |  |
| Polyol E |  |  |  |  |  |  |  |  | 10 |  |  |  |
| Blowing agent |  |  |  |  |  |  |  |  |  |  |  |  |
| Water | 7.0 | 7.0 | 7.0 | 7.0 | 7.0 | 7.0 | 7.0 | 7.0 | 7.0 | 7.0 | 7.0 | 7.0 |
| b |  |  |  |  | 4.0 |  |  |  |  | 4.0 |  |  |
| c |  |  |  |  |  | 4.0 |  |  |  |  | 4.0 |  |
| Density | 23 | 23 | 23 | 23 | 20 | 20 | 23 | 23 | 23 | 20 | 20 | 23 |
| Low-temperature shrinkage percentage | 0.5 | 0.4 | 0.2 | 0.0 | 0.0 | 0.1 | 0.3 | 7.8 | 9.0 | 5.0 | 7.0 | 13 |
| Storage stability | ○ | ○ | ○ | ○ | ○ | ○ | ○ | x | x | x | x | ○ |

TABLE 6

|  | 56 | 57 | 58 | 59 | 60 | 61 | 62 | 63 | 64 | 65 | 66 | 67 |
|---|---|---|---|---|---|---|---|---|---|---|---|---|
| Polyol a | 20 | 20 | 20 | 20 | 20 | 20 |  | 20 | 20 | 20 | 20 | 20 |
| Polyol b | 5 | 5 | 5 | 5 | 5 | 5 | 10 | 5 | 5 | 5 | 5 | 5 |
| Polyol d |  |  |  |  |  |  | 40 |  |  |  |  |  |
| Polyol e | 75 | 75 | 75 | 75 | 75 | 75 | 50 | 75 | 75 | 75 | 75 | 75 |
| Polyol A | 3.0 |  |  |  |  |  |  |  |  |  |  |  |
| Polyol B |  | 3.0 | 2.0 |  |  |  |  |  |  |  |  |  |
| Polyol C |  |  | 2.0 | 2.0 | 2.0 | 2.0 |  |  |  |  |  |  |
| Polyol D |  |  |  |  |  |  |  | 3.0 |  | 3.0 | 3.0 |  |
| Polyol E |  |  |  |  |  |  |  |  | 3.0 |  |  |  |
| Blowing agent |  |  |  |  |  |  |  |  |  |  |  |  |
| Water | 0.5 | 0.5 | 0.5 | 0.5 | 0.5 | 0.5 | 0.5 | 0.5 | 0.5 | 0.5 | 0.5 | 0.5 |
| a | 50 | 50 | 50 | 50 | 50 | 50 | 50 | 50 | 50 | 50 | 50 | 50 |
| b |  |  |  | 4.0 |  |  |  |  | 4.0 |  |  |  |
| c |  |  |  |  | 4.0 |  |  |  |  | 4.0 |  |  |
| Density | 22 | 22 | 22 | 22 | 20 | 20 | 22 | 22 | 22 | 20 | 20 | 22 |
| Low-temperature shrinkage percentage | 0.5 | 0.4 | 0.2 | 0.0 | 0.0 | 0.1 | 0.3 | 8.0 | 10 | 5.0 | 7.0 | 14 |
| Storage stability | ○ | ○ | ○ | ○ | ○ | ○ | ○ | x | x | x | x | ○ |

TABLE 7

|  | 68 | 69 | 70 | 71 | 72 | 73 | 74 | 75 | 76 | 77 | 78 | 79 |
|---|---|---|---|---|---|---|---|---|---|---|---|---|
| Polyol a | 20 | 20 | 20 | 20 | 20 | 20 |  | 20 | 20 | 20 | 20 | 20 |
| Polyol b | 5 | 5 | 5 | 5 | 5 | 5 | 10 | 5 | 5 | 5 | 5 | 5 |
| Polyol d |  |  |  |  |  |  | 40 |  |  |  |  |  |
| Polyol e | 75 | 75 | 75 | 75 | 75 | 75 | 50 | 75 | 75 | 75 | 75 | 75 |
| Polyol A | 3.0 |  |  |  |  |  |  |  |  |  |  |  |
| Polyol B |  | 3.0 | 2.0 |  |  |  |  |  |  |  |  |  |
| Polyol C |  |  | 2.0 | 2.0 | 2.0 | 2.0 |  |  |  |  |  |  |
| Polyol D |  |  |  |  |  |  |  | 3.0 |  | 3.0 | 3.0 |  |
| Polyol E |  |  |  |  |  |  |  |  | 3.0 |  |  |  |
| Blowing agent |  |  |  |  |  |  |  |  |  |  |  |  |
| Water | 0.5 | 0.5 | 0.5 | 0.5 | 0.5 | 0.5 | 0.5 | 0.5 | 0.5 | 0.5 | 0.5 | 0.5 |
| d | 50 | 50 | 50 | 50 | 50 | 50 | 50 | 50 | 50 | 50 | 50 | 50 |
| b |  |  |  | 4.0 |  |  |  |  | 4.0 |  |  |  |
| c |  |  |  |  | 4.0 |  |  |  |  | 4.0 |  |  |
| Density | 20 | 20 | 20 | 20 | 18 | 18 | 20 | 20 | 20 | 18 | 18 | 20 |
| Low-temperature shrinkage percentage | 0.5 | 0.4 | 0.2 | 0.0 | 0.0 | 0.1 | 0.3 | 8.0 | 10 | 6.0 | 7.5 | 13 |
| Storage stability | ○ | ○ | ○ | ○ | ○ | ○ | ○ | x | x | x | x | ○ |

TABLE 8

|  | 80 | 81 | 82 | 83 | 84 | 85 | 86 | 87 | 88 | 89 | 90 | 91 | 92 | 93 |
|---|---|---|---|---|---|---|---|---|---|---|---|---|---|---|
| Polyol a | 20 | 20 | 20 |  | 20 | 20 | 20 |  | 20 | 20 | 20 | 20 | 20 | 20 |
| Polyol b | 5 | 5 | 5 | 10 | 5 | 5 | 5 | 10 | 5 | 5 | 5 | 5 | 5 | 5 |
| Polyol d |  |  |  | 40 |  |  |  | 40 |  |  |  |  |  |  |
| Polyol e | 75 | 75 | 75 | 50 | 75 | 75 | 75 | 50 | 75 | 75 | 75 | 75 | 75 | 75 |
| Polyol A | 3.0 |  |  |  | 3.0 |  |  |  |  |  |  |  |  |  |
| Polyol B |  | 3.0 |  |  |  | 3.0 |  |  |  |  |  |  |  |  |
| Polyol C |  |  | 3.0 | 3.0 |  |  | 3.0 | 3.0 |  |  |  |  |  |  |
| Polyol D |  |  |  |  |  |  |  |  | 3.0 |  | 3.0 |  |  |  |
| Polyol E |  |  |  |  |  |  |  |  |  | 3.0 |  | 3.0 |  |  |
| Blowing agent |  |  |  |  |  |  |  |  |  |  |  |  |  |  |
| Water | 1.5 | 1.5 | 1.5 | 1.5 | 1.5 | 1.5 | 1.5 | 1.5 | 1.5 | 1.5 | 1.5 | 1.5 | 1.5 | 1.5 |
| e | 20 | 20 | 20 | 20 |  |  |  |  | 20 | 20 |  |  | 20 |  |
| f |  |  |  |  | 20 | 20 | 20 | 20 |  |  | 20 | 20 |  | 20 |
| Density | 23 | 23 | 23 | 23 | 23 | 23 | 23 | 23 | 23 | 23 | 23 | 23 | 23 | 23 |
| Low-temperature shrinkage percentage | 0.5 | 0.4 | 0.2 | 0.0 | 0.0 | 0.1 | 0.3 | 0.4 | 8.0 | 10 | 6.0 | 7.5 | 13 | 12 |
| Storage stability | ○ | ○ | ○ | ○ | ○ | ○ | ○ | ○ | x | x | x | x | ○ | ○ |

TABLE 9

|  | 94 | 95 | 96 | 97 | 98 | 99 | 100 | 101 | 102 | 103 | 104 | 105 |
|---|---|---|---|---|---|---|---|---|---|---|---|---|
| Polyol d |  |  |  |  |  |  | 40 |  |  |  |  |  |
| Polyol e | 75 | 75 | 75 | 75 | 75 | 75 | 60 | 75 | 75 | 75 | 75 | 75 |
| Polyol f | 25 | 25 | 25 | 25 | 25 | 25 |  | 25 | 25 | 25 | 25 | 25 |
| Polyol e | 10 |  |  |  |  |  |  |  |  |  |  |  |
| Polyol A |  | 10 | 5.0 |  |  |  |  |  |  |  |  |  |
| Polyol B |  |  |  | 5.0 | 5.0 | 5.0 | 5.0 |  |  |  |  |  |
| Polyol C |  |  |  |  |  |  |  |  |  |  |  |  |
| Polyol D |  |  |  |  |  |  |  | 10 |  | 10 | 10 |  |
| Polyol E |  |  |  |  |  |  |  |  | 10 |  |  |  |
| Blowing agent |  |  |  |  |  |  |  |  |  |  |  |  |
| Water | 7.0 | 7.0 | 7.0 | 7.0 | 7.0 | 7.0 | 7.0 | 7.0 | 7.0 | 7.0 | 7.0 | 7.0 |
| b |  |  |  |  | 4.0 |  |  |  |  | 4.0 |  |  |
| c |  |  |  |  |  | 4.0 |  |  |  |  | 4.0 |  |
| Density | 24 | 24 | 24 | 24 | 22 | 22 | 24 | 24 | 24 | 22 | 22 | 24 |
| Low-temperature shrinkage percentage | 0.5 | 0.4 | 0.2 | 0.0 | 0.0 | 0.1 | 0.3 | 8.1 | 11 | 5.4 | 7.9 | 15 |
| Storage stability | ○ | ○ | ○ | ○ | ○ | ○ | ○ | x | x | x | x | ○ |

INDUSTRIAL APPLICABILITY

The method of the present invention can continuously provide rigid synthetic resin foam boards and rigid synthetic resin foam siding materials comprising rigid synthetic resin foams having good dimension stability. The polyol composition of the present invention shows good dispersion stability and has an effect that it can be used without any trouble even after a long time of standing.

What is claimed is:

1. A method of producing a heat insulating board comprising two opposed facings and a core made of a rigid synthetic resin foam, which comprises spraying or injecting a foam mix for the rigid synthetic resin foam into the space between the opposed face materials and expanding and curing the foam mix, wherein the foam mix comprises the following polyol (V), a polyisocyanate, a foam stabilizer, a catalyst and a blowing agent:

polyol (V): a polyol containing the following polyether polyol (X), the following amine-type polyol (Y) and at least 0.01 wt %, based on the total weight of the polyol (V), of fine polymer particles obtained by polymerizing a monomer having at least one polymerizable unsaturated group, stably dispersed in the polyol (V);

polyether polyol (X): a polyether polyol having a hydroxyl value of at most 84 mgKOH/g and an oxyethylene group content of at least 40 wt %; and amine-type polyol (Y): a polyether polyol which is obtained by adding a cyclic ether to an amine compound and has a hydroxyl value of from 250 to 900 mgKOH/g.

2. The method according to claim 1, wherein the amine-type polyol (Y) is obtained by adding a cyclic ether to a saturated cyclic amine compound.

3. The method according to claim 1 or 2, wherein the polyol (V) is the following polymer-dispersed polyol (A) or a mixture of the following polymer-dispersed polyol (A) and another polyol:

polymer-dispersed polyol (A): a polymer-dispersed polyol containing fine polymer particles obtained by polymerizing a monomer having a polymerizable unsaturated group stably dispersed in an polyol (W) and having an average hydroxyl value of from 200 to 800 mgKOH/g, wherein the polyol (W) is a polyol mixture consisting of from 5 to 97 wt % of the polyether polyol (X) and from 3 to 95 wt % of the amine-type polyol (Y) or a polyol mixture consisting of from 5 to 97 wt % of the polyether polyol (X), from 3 to 95 wt % of the amine-type polyol (Y) and from more than 0 wt % to 92 wt % of the following polyol (Z):

polyol (Z): a polyol other than the polyether polyol (X) and the amine-type polyol (Y).

4. The method according to claim 3, wherein the polymer-dispersed polyol (A) is a stable dispersion of fine polymer particles obtained by polymerizing a monomer having a polymerizable unsaturated group consisting of from 5 to 90 wt % of an ethylenic unsaturated nitrile and from 10 to 95 wt % of another monomer in the polyol (W).

5. The method according to claim 4, wherein the polymer-dispersed polyol (A) is a stable dispersion of fine polymer particles obtained by polymerizing a monomer having a polymerizable unsaturated group consisting of an ethylenic unsaturated nitrile and another monomer in the polyol (W), wherein the monomer having a polymerizable unsaturated group consists of from 5 to 90 wt % of an ethylenic unsaturated nitrile and from 10 to 95 wt % of a styrene-type monomer or a vinyl carboxylate-type monomer.

6. The method according to claim 3, wherein the polyol (V) is a mixture of from 0.1 wt % to less than 100 wt % of the polymer-dispersed polyol (A) and from more than 0 wt % to 99.9 wt % of another polyol.

7. A polyol composition for production of a heat insulating board comprising two opposed facings and a core made of a rigid synthetic resin foam by spraying or injecting a foam mix for the rigid synthetic resin obtained by mixing the polyol composition and a polyisocyanate compound into the space between the two opposed facings and expanding and curing the foam mix, which comprises a polyol (V), a foam stabilizer, a catalyst and blowing agent as essential components, wherein the polyol (V) is a polyol containing the following polyether polyol (X), the following amine-type polyol (Y) and at least 0.01 wt %, based on the total weight of the polyol (V), of fine polymer particles obtained by polymerizing a monomer having at least one polymerizable unsaturated group, stably dispersed in the polyol (V);

polyether polyol (X): a polyether polyol having a hydroxyl value of at most 84 mgKOH/g and an oxyethylene group content of at least 40 wt %; and amine-type polyol (Y): a polyether polyol which is obtained by adding a cyclic ether to an amine compound and has a hydroxyl value of from 250 to 900 mgKOH/g.

8. The polyol composition according to claim 7, wherein the amine-type polyol (Y) is obtained by adding a cyclic ether to a saturated cyclic amine compound.

9. The polyol composition according to claim 7 or 8, wherein the polyol (V) is a mixture of from 0.1 wt % to less than 100 wt % of the following polymer-dispersed polyol (A) and from more than 0 wt % to 99.9 wt % of another polyol:

polymer-dispersed polyol (A): a polymer-dispersed polyol containing fine polymer particles obtained by polymerizing a monomer having a polymerizable unsaturated group stably dispersed in an polyol (W) having an average hydroxyl value of from 200 to 800 mgKOH/g, wherein the polyol (W) is a polyol mixture consisting of from 5 to 97 wt % of the polyether polyol (X) and from 3 to 95 wt % of the amine-type polyol (Y) or a polyol mixture consisting of from 5 to 97 wt % of the polyether polyol (X), from 3 to 95 wt % of the amine-type polyol (Y) and from more than 0 wt % to 92 wt % of the following polyol (Z):

polyol (Z): a polyol other than the polyether polyol (X) and the amine-type polyol (Y).

10. The polyol composition according to claim 9, wherein the polymer-dispersed polyol (A) is a stable dispersion of fine polymer particles obtained by polymerizing a monomer having a polymerizable unsaturated group consisting of an ethylenic unsaturated nitrile and another monomer in the polyol (W), wherein the monomer having a polymerizable unsaturated group consists of from 5 to 90 wt % of an ethylenic unsaturated nitrile and from 10 to 95 wt % of a styrene-type monomer or a vinyl carboxylate-type monomer.

* * * * *